March 3, 1953     C. W. MORAVCIK     2,629,928
AUTOMATIC CLEAVER
Filed Jan. 29, 1951
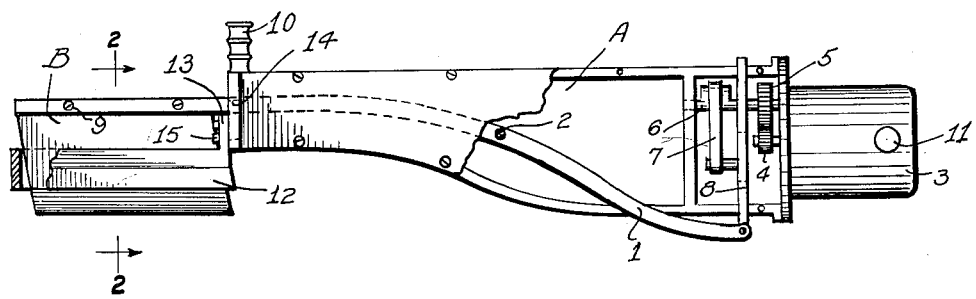
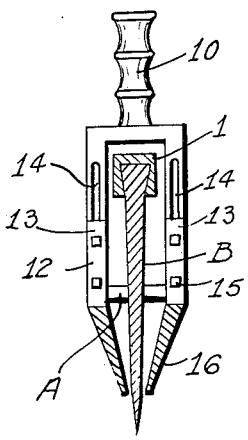
INVENTOR
CARL W. MORAVCIK
ATTORNEY Patented Mar. 3, 1953

2,629,928

UNITED STATES PATENT OFFICE 2,629,928

AUTOMATIC CLEAVER

Carl W. Moravcik, East St. Louis, Ill.

Application January 29, 1951, Serial No. 208,266

2 Claims. (Cl. 30—272)

This invention relates generally to meat-cutting implements, and more particularly to such an instrument that is especially adapted for use in a slaughter-house or the like.

The invention has among its general objects, the production of a device of the kind described, that will be relatively simple in its operation and construction, be extremely sturdy and rigid so as to well withstand the service to which it is apt to be subjected in normal commercial use, be neat and compact so as to be portable and easily manipulated, easy to operate and which will be otherwise satisfactory for use wherever deemed applicable.

One of the principal objects of my invention is to so construct such a device that it will perform all of the duties of a meat cleaver, but will be actuated automatically instead of being hand manipulated, and will permit of substantially complete freedom of chopping movement during operation.

Another object of the invention is to provide a guard and guide in association with the cutting edge of the cleaver, so as to minimize the hazards incident to a moving cutting blade, and to spread the cut through the carcass as the cutting proceeds.

An added object of my invention is to so construct said device that said guard element may be adjusted from time to time, with repeated re-sharpenings of the cutting edge of the blade of the cleaver, to have a predetermined width of cutting edge exposed and projecting beyond said guard.

A further object of the invention is to so mount said cleaver that it may be readily detachable from its operating arm, to permit easier re-sharpenings of the cleaver as the occasions become necessary, and to even replace the worn-out or broken cleaver when desired.

Many other objects and advantages of the construction herein shown and described, and the uses and advantages thereby obtained, will be obvious to those skilled in the art to which this invention appertains, as will be apparent from the disclosures hereinafter given.

To this end, my invention consists in the novel construction, arrangement, combination and form herein shown and described, and as will be more clearly pointed out in the following specification.

In the drawings, wherein like reference characters indicate like or corresponding parts throughout the views, Figure 1 is a side elevation of the automatic cleaver, with a portion of the casing broken away in order to set forth the mechanism more clearly; and Figure 2 is an enlarged cross-section detail, taken substantially along the line 2—2 of Fig. 1.

Referring more particularly to the drawings, wherein I have illustrated a preferred embodiment of my invention, there is shown a tool for splitting carcasses of animals at any desired stage of slaughter-house operation, as for example splitting the carcass longitudinally along the back-bone to make a pair of equal and symmetrical half-carcasses.

This splitting operation is generally done with a hand-manipulated cleaver, the carcass being suspended, and travelling slowly forward, the operator walking alongside the carcass and performing the splitting operation with a succession of short chopping strokes. However, such work is tiring, and often the split is not exactly along the line intended, and consequently the two halves of the same animal are not symmetrically divided. Such unevenness results in complaints from purchasers of the split carcasses, but this unworkmanlike result increases in occurrence toward the end of the work period, and when there is haste or tension of any kind.

The improved tool includes a casing, housing or frame A, of any desired shape and size suitable for the purpose, just so that it is well balanced and convenient to handle. An elongated arm or lever 1 is pivotally mounted intermediate its ends, as at 2, on said frame, there being a cleaver B detachably connected to one end of said arm, as will be more clearly hereinafter set forth, and to the other end of said arm is connected the driving means for manipulating the arm with its cleaver.

Although any suitable means may be used for automatically driving said arm so that the latter oscillates about its pivotal axis 2, I prefer to use the means shown and comprising a motor 3, to the end of which is affixed a pinion 4. A second gear 5 meshes with and is driven by said pinion 4, the gear 5 being connected with a cam shaft 6 to which is rotatably connected one end of a connecting rod 7, the other end of said rod 7 pivoted to a reciprocatory link or element 8 that is slidably mounted in said frame.

The rear end of said rocker arm or lever 1 is pivotally connected to an end of said link 8, so that the rotary drive of said motor will transmit a back and forth motion to said link, to rock said lever 1 in operation.

If desired, the outwardly projecting end portion of said lever 1 may be made hollow, or dove-tailed in cross-section, for the distance deemed necessary, in order to removably receive the correspondingly shaped top edge portion of the cleaver blade B, and if preferred, one or more fastening screws 9 may secure the blade in place in the lever slot. In this manner the blade may be removed for repeated sharpenings, or a new blade be replaced in the event of damage or breakage of the old one.

In order that the operator may more easily control the movement of the cleaver, handles 10 and 11 may be provided, for carrying the device, and further, the entire tool may be suspended from above, as from a track, and with suitable counterweights, in any well-known manner, so that a more efficient use of the tool might be had.

Obviously, the better the control of the cleaver along the path intended, the better the resultant work on the carcasses, and in order to most accurately guide the blade as the work operation proceeds, I have provided a combination guard and guide element in association with the cleaver blade. This element as shown, consists of a band 12 approximately U-shaped in horizontal cross-section, extending about the blade to enclose the latter, especially at the front and along the sides, the lower edges of said band extending substantially parallel with the cutting edge of the blade and exposing only a predetermined width of said blade below the guard.

This element 12 is provided with a pair of ears 13—13 for placement against the front face of the frame A, and in order to permit of vertical adjustment of said element relatively of the cleaver blade, elongated slots 14—14 may be provided through the front face of said frame, to receive the fastening screws 15, and whereby the guard element is removably and adjustably mounted to said frame.

Now, a predetermined width of cutting edge of the blade may be left to project downwardly beyond the lower edge of the guard, and even though the blade is re-sharpened repeatedly, the guard may be adjustably raised to compensate for the loss of material removed by such sharpenings, and still maintain the exposed or working width of the cutting edge fairly constant.

Not only does the element 12 serve as a guard, by interposing a barrier between the blade and the operator, to either side, but the lower portion of said guard is made substantially V-shaped in transverse or vertical cross-section, so that the lower portions of the sides of the element are tapered downwardly, as indicated at the portions 16, to converge to a point closely adjacent the cutting edge of the blade. This wedge-shaped transverse cross-section of the lower portion of the element 12 will act as a spreader along the split being cut by the cleaver, to thereby not only make the cleaver cut without undue frictional contact with the carcass, but acts to centralize the cutting edge so that the desired line of cut may be more easily and more accurately done.

Having thus described my invention, it is obvious that various immaterial modifications may be made in the same without departing from the spirit of my invention; hence I do not wish to be understood as limiting myself to the exact form, arrangement, construction and combination of parts herein shown and described, or the uses mentioned, except as limited by the state of the art to which invention appertains, and by the claims hereunto appended.

What I claim as new and desire to secure by Letters Patent is:

1. In a meat cutting tool of the kind described, a portable frame, an arm pivotally mounted intermediate its ends on said frame, driving means mounted on said frame and operably connected to one end of said arm for oscillating the latter about its pivotal axis, a sharpened cleaver element mounted on the other end of said arm, a guard element mounted on said frame independently of said cleaver element and through which the cutting edge of said cleaver element projects, and means for adjustably varying the positioning of said guard on said frame so that said cutting edge of the cleaver element may project a predetermined distance beyond said guard to compensate for repeated sharpenings of the cutting edge of the cleaver element.

2. In a meat cutting mechanism of the kind described, a portable carrying frame, a rocker arm pivoted thereon, drive means on said frame and connected to said arm to operably rock the same about its pivotal axis, a cleaver blade detachably carried by said arm, a U-shaped guard fixed on said frame and entirely encircling said blade and through which the cutting edge of said blade extends and movably operates relatively thereto, said guard being substantially V-shaped in transverse cross-section, and means for adjustably mounting said guard on said frame to expose a predetermined amount of said cutting edge to compensate for wear of said cutting edge.

CARL W. MORAVCIK.

REFERENCES CITED

The following references are of record in the file of this patent:

UNITED STATES PATENTS

| Number | Name | Date |
|---|---|---|
| 1,216,381 | Watson | Feb. 20, 1917 |
| 1,390,702 | Hammond | Sept. 13, 1921 |
| 1,651,823 | Kelleher | Dec. 6, 1927 |
| 1,849,079 | Eiseman | Mar. 15, 1932 |

FOREIGN PATENTS

| Number | Country | Date |
|---|---|---|
| 753,902 | France | Aug. 21, 1933 |